United States Patent [19]

Adolf et al.

[11] 4,447,202
[45] May 8, 1984

[54] DEVICE FOR THE PREPARATION OF HOLLOW CONFECTIONERY PARTS

[75] Inventors: Lutz-Erdmut Adolf, Bielefeld; Klaus Oberwelland, Steinhagen, both of Fed. Rep. of Germany

[73] Assignee: August Stork KG, Halle/Westfalen, Fed. Rep. of Germany

[21] Appl. No.: 340,757

[22] Filed: Jan. 19, 1982

[30] Foreign Application Priority Data

Jan. 19, 1981 [DE] Fed. Rep. of Germany ....... 3101442

[51] Int. Cl.³ .......................... B29C 5/04; B29F 5/00; A23G 1/21; A23G 3/12
[52] U.S. Cl. .................................................. 425/434
[58] Field of Search .............. 425/261, 257, 258, 259, 425/444, 434, 453; 474/61, 62, 172; 74/191, 203, 202, 204, 205, 206, 190.5; 118/322; 198/377, 645, 651, 648, 378

[56] References Cited

U.S. PATENT DOCUMENTS

| | | | |
|---|---|---|---|
| 863,376 | 8/1907 | Gawron | 74/191 |
| 2,015,057 | 9/1935 | Boisvert | 74/202 |
| 2,210,187 | 8/1940 | Ross | 118/322 |
| 2,490,903 | 12/1949 | Graves | 198/377 |
| 2,745,374 | 5/1956 | Pikal | 118/16 |
| 2,864,281 | 12/1958 | Draper | 198/377 |
| 2,946,689 | 7/1960 | Pikal | 425/102 |
| 2,958,308 | 11/1960 | Pikal | 118/16 |
| 3,666,388 | 5/1972 | Oberwelland et al. | 425/261 |
| 3,891,044 | 6/1975 | Tiede | 74/190 |
| 4,014,156 | 3/1977 | Klahn et al. | 426/279 |
| 4,063,864 | 12/1977 | Oberwelland et al. | 425/433 |

*Primary Examiner*—Willard E. Hoag
*Attorney, Agent, or Firm*—Schwartz, Jeffery, Schwaab, Mack, Blumenthal & Koch

[57] ABSTRACT

A device for the production of parts of confections comprises a plurality of cup shaped centrifugal molds (18), open at the top and arranged successively on a conveyor installation (10), supplied from above with a confectionery mass and rotated intermittently around a vertical axis by a drive (36). The centrifugal molds (18) have drive cogs (20) extending in the downward direction. The drive (36) comprises a drive element (56) moving in a stationary path located laterally in relation to the drive cogs (20) and frictionally engaging the drive cogs (20) during the movement of the conveyor installation (10).

16 Claims, 6 Drawing Figures

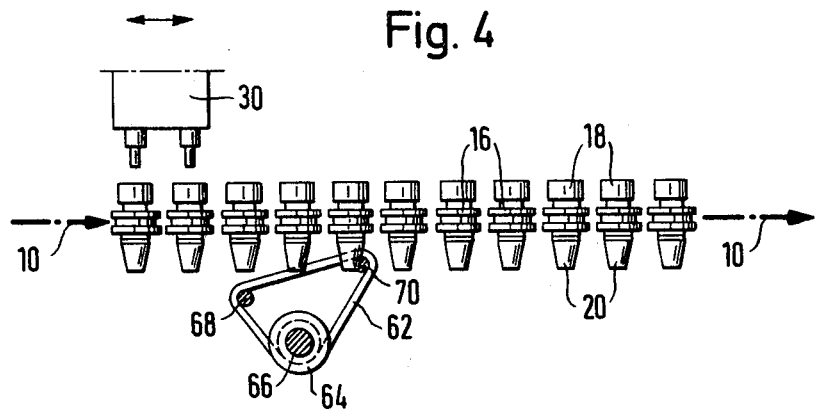
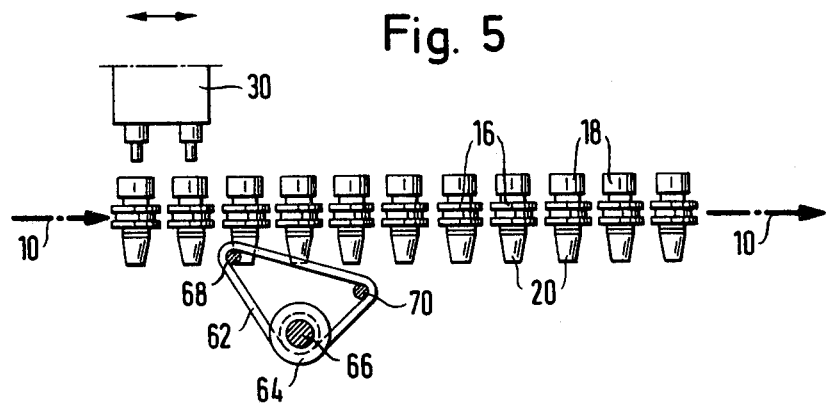

DEVICE FOR THE PREPARATION OF HOLLOW CONFECTIONERY PARTS

BACKGROUND OF THE INVENTION

The invention relates to a device for the preparation of hollow confectionery parts with the aid of a plurality of cup-shaped centrifugal molds, which are open at the top and arranged successively on a conveyor installation, said molds being supplied with confectionary and optionally, filling substances by means of feeder devices located above the molds and are intermittently rotated about a vertical axis by a drive axle. The drive engages the downwardly extended driving cogs of the centrifugal molds.

A device of this type is known from applicants' German Pat. No. 1,055,056. The known device has proved itself in years of actual practice, but appears to be capable of improvement with respect to the drive. In the known device, the drive is effected by means of rotatable coupling elements, which may be lifted from beneath the conveyor plane to a position in contact with the lower drive cogs of the centrifugal molds. The position of the coupling elements and their elevation must be adjusted with a relatively high degree of accuracy, so that the coupling elements will engage with adequate accuracy the drive elements of the centrifugal molds in the predetermined stopping positions of the conveyor which is moving forward discontinuously. In the case of a conveyor installation with adjacent rows of centrifugal molds, at least one separate coupling element must be provided for each row, and all of the coupling elements must be connected with each other and/or with a central drive motor by means of toothed gearings or the like. Additionally, a further drive must be provided to individually raise and lower the coupling elements. This drive mechanism is complex and, is thus correspondingly susceptible to malfunctioning. These operating problems are even more pronounced in a continuously operating installation, wherein, as the result of the unavoidable wear, shifts in the positions of drive members, coupling elements and the like, may occur, making readjustments necessary.

Furthermore, in the known installation, it frequently happens that the cyclically raised coupling elements remain in their upper position for various reasons, whereupon they are impacted by the drive cog following them, thereby causing substantial damage to the conveyor chain and the entire drive mechanism.

Additional investments are required if the conveyor installatin of a machine of this type is to operate not in a stepwise operation, but in a continuous manner. Continuous drive means are desirable, particularly, because in the case of a discontinuous drive mechanism, the entire conveyor installation, possibly with a large number of centrifugal molds, their holders, etc., must be acelerated in each step. The expenditure of a considerable amount of energy is, therefore, unavoidable.

In a continuous operation of the conveyor installation, it is necessary to cause the drive mechanism for the centrifugal molds to travel in its entirety with the conveyor installation over a limited path, and then to return to its initial position. This appreciably enhances the difficulties inherent in the accurate alignment of the coupling elements with the drive cogs of the centrifugal molds.

SUMMARY OF THE INVENTION

It is therefore an object of the present invention to construct an apparatus of the type mentioned in the introduction in such a way that a simple drive means for the centrifugal molds in the case of a continuous running conveyor system is assured.

The object of the invention is attained according to the invention in an installation of this type by that the drive mechanism comprises a drive element moving in a stationary guideway located laterally with respect to the drive cogs, said drive element entering into frictional engagement during the motion of the conveyor installation successively with the drive cogs of the centrifugal molds.

A device of this type not only permits the continuous and thus energy-saving operation of the conveyor installation, but simultaneously also permits the continuous actuation of the drive for the centrifugal molds. The driving of the centrifugal molds does not require any type of actuating and deactivating processes carried out in a time cycle coordinated with the motion of the centrifugal molds, and it is not necessary to raise or otherwise displace a plurality of drive elements in a corresponding timing cycle. Rather, there are required only drive elements, such as for example V-belts, friction disks or the like, which continuously rotate in a predetermined position. The synchronization of the drives of the centrifugal molds with the motion of the conveyor installation, accomplished in the known installation in such a complex manner, is obtained simply and without additional measures because the drive cogs of the centrifugal molds are moving past the drive elements over a certain path length of the conveyor installation.

In a conveyor installation wherein several rows of centrifugal molds are arranged adjacently to each other, one drive element may be used for two adjacent rows of molds, so that the drive mechanism is further simplified. Furthermore, all of the friction disks or all of the drive rollers for the drive belts may be arranged on a single drive shaft located transversely under the conveyor installation. Since in the known device, the coupling elements are rotatable around a corresponding number of vertical axles arranged parallel to each other, voluminous gear trains are required for the driving connection of the individual coupling elements.

The drive cogs of the centrifugal molds preferably have the configuration of the downwardly narrowing truncated cone, thereby facilitating the engagement of the drive element involved.

Preferred embodiments of the invention are explained in more detail in the following text with the aid of the accompanying drawings.

BRIEF DESCRIPTION OF THE DRAWINGS

FIGS. 4 and 5 illustrate a variant in two operating positions of the embodiment according to FIG. 3;

DETAILED DESCRIPTION OF PREFERRED EMBODIMENTS

Figure 1:
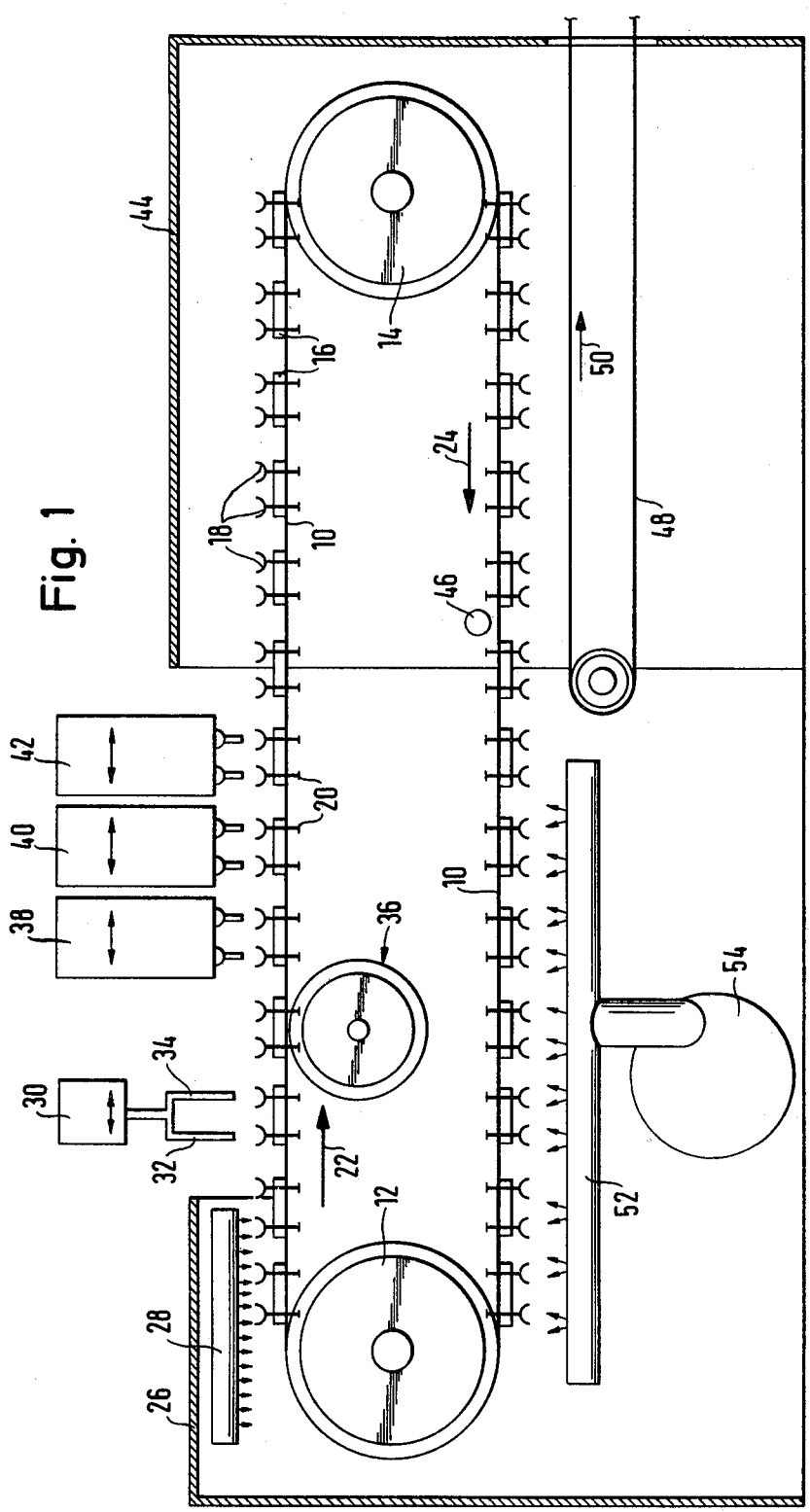
FIG. 1 is an overall schematic view of the device according to the present invention.

Initially, the device according to the invention shall be described in its entirety by reference to FIG. 1. Conveyor means in the form of an endless conveyor chain 10 travels around two drive drums 12 and 14, which are rotatably mounted by means of horizontal shafts. In conveyor cleats 16 extending transversely to the travelling direction, the conveyor chain carries two rows of centrifugal molds 18, located one behind the other in the direction of movement of the conveyor and extending transversely across the conveyor chain. The molds are rotatably supported in the conveyor cleats 16 and extend through the cleats with their drive cogs 30, which protrude from the cleats at their bottom side. The direction of movement of the conveyor chain is indicated in the drawing by the arrows 22, 24.

The upper strand of the conveyor chain 10 leaves the drive drum 12 within a housing 26, wherein a nozzle arrangement 28 is arranged over the path of the centrifugal molds to supply hot air and thus preheat the centrifugal molds 18.

Subsequently in the travelling direction of the conveyor, a feeder device 30 is located over the conveyor chain 10 to supply a flowable mass of a confection, for example, hard sugar. The feeder device is equipped with filler nozzles 32, 34 for two rows of centrifugal molds 18, located one behind the other. The feeder device 30 moves back and forth in accordance with the double arrow, (not numbered) so that it follows the movement of the conveyor chain over a section of the travel path, during the filling process.

Located underneath the feeder device 30 or in a position downstream in the direction of the movement of the conveyor is a drive mechanism designated in its entirety by reference mumeral 36. With this mechanism, the centrifugal molds are set in motion intermittently. The drive mechanism will be described in more detail hereinafter. By virtue of the resulting rotation of the molds, the mass of the confectionery material is distributed in a shell-like manner over the inner wall of the centrifugal molds, so that it solidifies in the shape of a cup upon cooling. The position of the drive mechanism 36 in relation to the feeder device 30 is preferably adjustable so that the onset of the centrifugal process may be adapted to the solidification behavior of the mass of the confection. Similarly, the period of time of engagement of the drive mechanism may be adjusted in a suitable manner according to the solidification behavior. Downstream of the drive mechanism 36, feeder devices 38, 40, 42 are provided over the conveyor chain, which likewise move back and forth and thus follow the path of the conveyor chain 10 over a certain section of its path. These feeder devices provide for the insertion of suitable filler and sealing substances, e.g., in the form of flowable masses or solid products, such as hazelnuts, cherries, raisins and the like.

Subsequently, the conveyor chain 10 enters another housing 44, wherein the centrifugal molds 18 together with the conveyor chain 10 move around the drive drum 14 to the lower strand of the conveyor chain. A cooling line segment may be provided within the housing 44, whereby the final solidification of the confectionery parts if furthered. The reference numeral 46 designates a schematically indicated discharge installation which operates, for example, with tappets, not shown, integrated into the centrifugal molds. In this manner, the finished confectionery products are ejected onto a discharge conveyor 48, which moves out of the housing 44 in the direction of the arrow 50. A further nozzle arrangement 52 is located in the terminal area of the lower strand, and it is supplied with hot air by a blower 54, thereby serving to preheat the centrifugal molds 18.

For further details of this installation, reference is made to the above-cited German Pat. No. 1 955 056 of the applicants.

Figure 2:
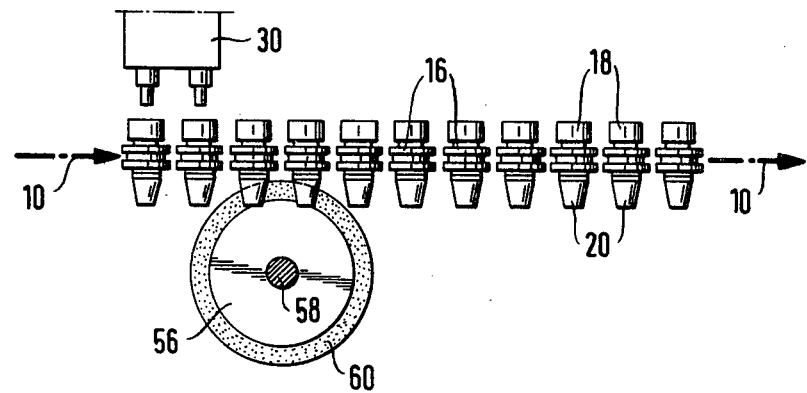
FIG. 2 is a more detailed schematic view of an embodiment of the drive for the centrifugal molds according to the invention.

FIG. 2 shows a schematic representation of a section of the device according to FIG. 1, showing in more detail one embodiment of the drive according to the invention for the centrifugal molds. The centrifugal molds 18 are, according to FIG. 2, again rotatably supported in conveyor cleats 16 extending transversely to the path of the conveyor and are equipped at their lower ends with drive cogs 20, which in this case have the configuration of a frustrum of a cone. The feeder device 30 is again positioned over the path of the conveyor chain 10.

A friction wheel 56 is provided below the conveyor chain for the intermittent rotation of the centrifugal molds 18. The friction wheel is rotated by a shaft 58 extending below and transversely to the conveyor chain 10. The friction wheel 56 has a bevelled edge surface 60, and the bevel angle thereof is adapted to the conical bevel of the drive cogs 20. The plane of rotation of the friction wheel 56 is located laterally in relation to the path of motion of the drive cogs, in a position whereby frictional contact between the drive cog and the friction wheel is assured. The edge surface 60 and/or the drive cogs 20 may be provided with a friction layer, optionally with an elastic friction layer of rubber or the like, thereby insuring a secure grip. The drive parts may also be supported elastically.

It is possible to arrange a single friction wheel 56, in a manner not shown, between two adjacent rows of centrifugal molds so that one friction wheel cooperates with the drive cogs of both rows.

Figure 3:
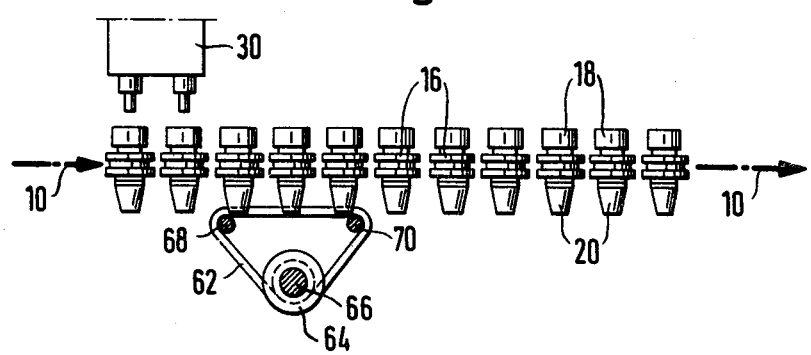
FIG. 3 is a figure showing a further embodiment.

Another embodiment of the drive mechanism for the centrifugal molds is shown in FIG. 3. In place of the friction wheel 56, an endless drive belt 62 is provided, which rotates about belt pulley 64, mounted on a shaft 66, which is again arranged horizontally and transversely beneath the conveyor chain 10. The drive belt 62 also moves around the reversing or idler rolls 68 and 70, defining in turn a path extending laterally in relation to the path of movement of a longitudinally aligned row of centrifugal molds 18 and drive cogs 20. Over the length of the segment located between the reversing rolls 68 and 70, the drive cogs 20 engage the drive belt 62. Here again, the drive belt 62 may be designed and arranged so that it cooperates with two adjacent rows of drive cogs.

In FIGS. 4 and 5, further embodiments of the invention are shown. They represent a variant of the embodiment of FIG. 3. In the case of FIG. 4, the axles of the reversing rolls 68 and 70 are at different heights, so that the axle of the reversing roll 70 is located above that of the reversing roll 68. In this manner, the drive cogs 20 initially engage the drive belt 62 with their lower ends having smaller diameters, whereby the centrifugal molds are accelerated to relatively high rotational speed, which slowly decreases as the drive belt 62 gradually engages the upper part of the drive cog 20 having a larger diameter. In the embodiment according to FIG. 5, the drive belt 62 at first grips the upper part of the drive cog 20 with the larger diameter and then gradually, during the subsequent motion of the conveyor, the lower, thinner area. This results in a corresponding manner, in an increasing acceleration of the rotating motion. Both possible variants may be appropriate under certain conditions, when it is considered useful to vary the rotational speed of the centrifugal molds during the centrifuging process, in order, for example, to prevent an overflow at the onset of the rotation of the initially relatively thin flowing filler mass, but where it is desirable during the further course of the process to increase the speed to obtain a uniform wall thickness.

The drive according to FIGS. 3 to 5 also permits a lengthening or shortening of the centrifuging time by a variation of the distance between the reversing rolls 68 and 70.

The axles of the reversing rolls 68 and 70 according to FIG. 3 may also be arranged vertically and not horizontally as shown, so that the drive belt 62 runs in a horizontal plane around the reversing rolls, if space permits.

In addition to the above-described drive elements, constantly moving drive elements of different configuration may be used, which are in frictional engagement with the drive cogs over a partial segment of the conveyor path.

Figure 6:
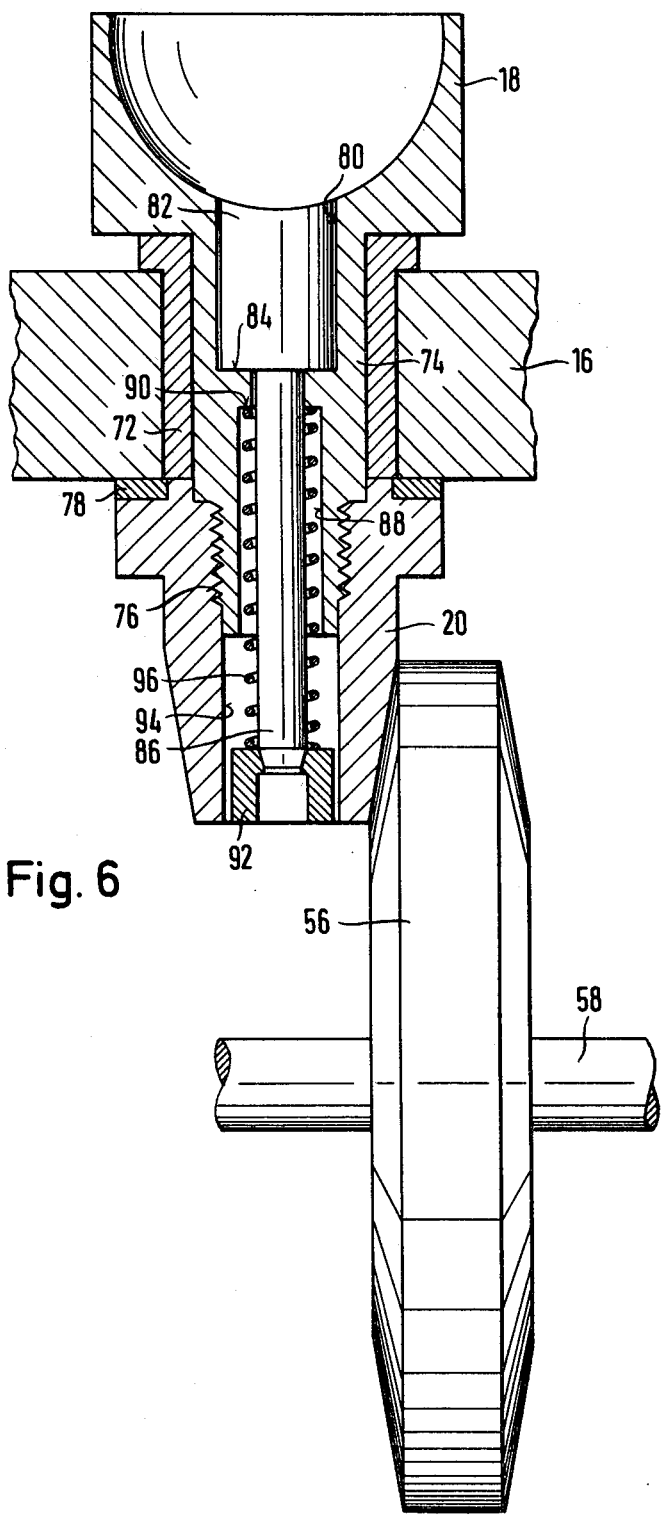
FIG. 6 is an enlarged cross-sectional view of the embodiment according to FIG. 2.

FIG. 6 shows, in a vertical cross section, a single centrifugal mold 18 with a conical drive cog 20 and the friction wheel 56 associated therewith. The centrifugal mold 18 is essentially cylindrical in shape and has at its upper side an essentially circular recess, not referenced, wherein the confectionery material to be centrifuged is filled.

A bearing sleeve 72 is arranged in a bore of the conveyor cleat 16 of the conveyor chain 10, which is not shown in its entirety. The sleeve 72 rotatingly receives a shaft 74 which projects downwardly and has a diameter smaller in relation to the upper area of the centrifugal mold 18. The drive cog 20 is screwed onto the lower end of the shaft 74 with the aid of threading 76 and is supported by means of a bearing disk 78 on the bottom side of the conveyor cleat 16. A vertical center bore 80 is located at the bottom of the centrifugal mold 18, wherein an ejector head 82 is arranged in a vertically displaceable manner. In the lower terminal position shown in FIG. 6, the upper surface of the ejector head 82 adapts to the hemispherical recess of the centrifugal mold 18. In this lower terminal position, the lower end of the ejector head 82 abuts against a lower shoulder 84 of the bore 80.

The lower end of the ejector head 82 extends downward in the form of a coaxial shaft 86, having a diameter smaller than that of the ejector head and also smaller than that of a bore 88 entering the lower end of the shaft 84 from below. This bore has an upper shoulder 90 located below the shoulder 84. An undesignated bore segment is provided between the shoulders 84 and 90, having a diameter essentially corresponding to the external diameter of the shaft 86. At the lower end of the shaft 86, a cylindrical bottom piece 92 is located within a bore 94 entering the drive cog 20 from below. Between the upper surface of the bottom piece 92 and the upper shoulder 90 of the bore 88, the shaft 86 is surrounded by a helical compression spring 96, prestressing the ejection head 82 into the lower terminal position shown in FIG. 6.

In the discharge device 46, indicated only in FIG. 1, wherein the centrifugal molds 18 are open in the downward position, i.e., located in a position 180° to that of FIG. 6, an ejector tappet, not shown, applies pressure to the bottom piece 92 of the ejector head 82, so that the finished confection part is loosened and ejected onto the discharge conveyor 48 shown in FIG. 1.

The drive of the centrifugal mold 18 shown in FIG. 6 is effected by means of the schematically indicated friction wheel 56 according to the embodiment of FIG. 2, which rotates continuously with shaft 58.

We claim:

1. An apparatus for the production of hollow confectionery parts, comprising:
   an endless conveyor;
   a plurality of cup-shaped centrifugal molds, successively arranged for rotation on said conveyor, each of said molds being open at the top and having a drive cog comprising the lower portion thereof;
   a first feeder device positioned above said centrifugal molds for supplying confectionery materials to said centrifugal molds; and
   a drive means for selectively and intermittently rotating said centrifugal molds, wherein said drive means comprises a drive element located laterally in relation to said drive cogs and moving in a stationary path, the location of said drive element being such that it successively frictionally engages said drive cogs of said centrigugal molds during the movement of said conveyor, wherein said cogs have conical frictional driving surface and said driving means has an inclined frictional driving surface for mating with said conical frictional driving surfaces.

2. An apparatus as defined in claim 1, further comprising a second feeder device positioned above said molds and downstream of said first filler device to supply filling substances to said centrifugal molds subsequent to the supply of said confectionery material.

3. An apparatus as defined in claim 1, comprising several adjacent rows of said centrifugal molds and wherein at least one drive element is positioned between said rows to simultaneously cooperate with the drive cogs of the two adjacent rows of said centrifugal molds.

4. An apparatus as defined in claim 1, wherein said drive element comprises a friction wheel which rotates about an axis extending transversely beneath said conveyor means.

5. An apparatus as defined in claim 1 or 2, wherein said drive element is positioned downstream of said confectionery material feeder device.

6. An apparatus as defined in claim 1, wherein said filler device includes means for moving them back and forth along a section of the path of said conveyor during the filling process.

7. An apparatus as defined in claim 1, further comprising an ejecting means for removing said confectionery material from each cylindrical mold.

8. An apparatus as defined in claim 1, further comprising a cooling means positioned downstream of said feeder device and upstream of said discharge device and a preheating means for preheating said centrifugal molds prior to filling positioned upstream of said filling device and downstream of said discharge device.

9. An apparatus as defined in claim 1, wherein the edge surface of said drive element comprises a friction layer.

10. An apparatus as defined in claim 1 wherein the edge surface of said drive cogs comprises a friction layer.

11. An apparatus as defined in claim 1, wherein said drive element comprises an endless belt having a straight path segment located laterally in relation to the path of at least one row of said drive cogs.

12. An apparatus as defined in claim 11, wherein said drive belt is inclined with respect to the horizontal to successively engage different vertical portions of said drive cogs and wherein said different vertical portions are of different diameter.

13. An apparatus as defined in claim 12, wherein said drive belt proceeds around reversing rolls rotating about axles which define straight path segments and are adjustable with respect to the horizontal.

14. An apparatus as defined in claim 13, wherein said axles are arranged vertically with respect to said conveyor means.

15. An apparatus for the production of hollow confectionery parts, comprising:

an endless conveyor;

a plurality of cup-shaped centrifugal molds, successively arranged for rotation on said conveyor, each of said molds being open at the top and having a drive cog comprising the lower portion thereof;

a first feeder device positioned above said centrifugal molds for supplying confectionery materials to said centrifugal molds; and a drive means for selectively and intermittently rotating said centrifugal molds, wherein said drive means comprises a drive element located laterally in relation to said drive cogs and moving in a stationary path, the location of said drive element being such that it successively frictionally engages said drive cogs of said centrifugal molds during the movement of said conveyor, said drive element being a rotary disk or belt having two frictional driving surfaces on laterally opposite sides for simultaneously engaging at least two of said drive cogs.

16. An apparatus for the production of hollow confectionery parts, comprising:

an endless conveyor;

a plurality of cup-shaped centrifugal molds, successively arranged for rotation on said conveyor, each of said molds being open at the top and having a drive cog comprising the lower portion thereof;

a first feeder device positioned above said centrifugal molds for supplying confectionery materials to said centrifugal molds; and a drive means for selectively and intermittently rotating said centrifugal molds, wherein said drive means comprises a drive element located laterally in relation to said drive cogs and moving in a stationary path, the location of said drive element being such that it successively frictionally engages said drive cogs of said centrifugal molds during the movement of said conveyor, wherein different vertical portions of said drive cogs are of different diameter and said drive means includes an elongated driving surface which is inclined relative to the path of said conveyor to engage said different vertical portions of said drive cogs at different positions along said path whereby the speed of rotation of said molds is changed as said molds progress along said path.

* * * * *